United States Patent
Grandjean et al.

(10) Patent No.: US 11,339,925 B2
(45) Date of Patent: May 24, 2022

(54) STATION AND METHOD FOR REFILLING PRESSURIZED GAS TANKS

(71) Applicant: L'Air Liquide, Societe Anonyme pour l'Etude et l'Exploitation des Procedes Georges Claude, Paris (FR)

(72) Inventors: Sosthene Grandjean, Versaille (FR); Thierry Ott, Brunoy (FR)

(73) Assignee: L'Air Liquide, Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 92 days.

(21) Appl. No.: 16/617,235

(22) PCT Filed: Apr. 16, 2018

(86) PCT No.: PCT/FR2018/050949
§ 371 (c)(1),
(2) Date: Nov. 26, 2019

(87) PCT Pub. No.: WO2018/220303
PCT Pub. Date: Dec. 6, 2018

(65) Prior Publication Data
US 2021/0131611 A1     May 6, 2021

(30) Foreign Application Priority Data
May 31, 2017    (FR) ........................... 1754787

(51) Int. Cl.
*F17C 5/06*     (2006.01)
*F17C 5/00*     (2006.01)
*F17C 13/02*    (2006.01)

(52) U.S. Cl.
CPC ................ *F17C 5/06* (2013.01); *F17C 5/007* (2013.01); *F17C 13/026* (2013.01);
(Continued)

(58) Field of Classification Search
CPC .......... F17C 5/06; F17C 5/007; F17C 13/026; F17C 2221/012; F17C 2223/0161;
(Continued)

(56) References Cited

U.S. PATENT DOCUMENTS 4,829,785 A * 5/1989 Hersey ................ H01M 8/0656
62/467
5,107,906 A * 4/1992 Swenson .................... F17C 9/02
141/11

(Continued)

FOREIGN PATENT DOCUMENTS

DE    10 2009 039645     3/2011
EP       2 175 187        4/2010

(Continued)

OTHER PUBLICATIONS

International Search Report and Written Report for PCT/FR2018/050949, dated Jul. 10, 2018.

(Continued)

*Primary Examiner* — Timothy L Maust
*Assistant Examiner* — James R Hakomaki
(74) *Attorney, Agent, or Firm* — Christopher J. Cronin

(57) ABSTRACT

A station and method for refilling a tank or tanks with pressurized gas in which liquefied gas is vaporized in a vaporizer. One portion of the vaporized gas is compressed to produce a compressed gas. Another portion of the vaporized gas is not compressed but instead is fed to a heat exchanger where it is used to cool the compressed gas. The thus-warmed gas is reinjected into a filling line that feeds the liquefied gas to the vaporizer.

18 Claims, 1 Drawing Sheet

(52) U.S. Cl.
CPC ............ *F17C 2221/012* (2013.01); *F17C 2223/0161* (2013.01); *F17C 2223/033* (2013.01); *F17C 2227/0157* (2013.01); *F17C 2250/043* (2013.01); *F17C 2250/0439* (2013.01); *F17C 2265/036* (2013.01); *F17C 2270/0139* (2013.01)

(58) Field of Classification Search
CPC ........ F17C 2265/036; F17C 2227/0157; F17C 2223/033; F17C 2250/043; F17C 2270/0139; F17C 2250/0439; F17C 2223/035; F17C 2223/043; F17C 2223/046; F17C 2225/0123; F17C 2225/036; F17C 2227/0302; F17C 2227/0339; F17C 2227/0388; F17C 2227/0393; F17C 2227/043; F17C 2250/01; F17C 2250/0631; F17C 2250/0636; F17C 2260/025; F17C 2265/033; F17C 2265/037; F17C 2265/065; F17C 7/04; Y02E 60/32
USPC ............................................... 62/53.2
See application file for complete search history.

(56) References Cited

U.S. PATENT DOCUMENTS

| | | | | |
|---|---|---|---|---|
| 5,165,246 | A * | 11/1992 | Cipolla | F17C 9/00 137/210 |
| 5,234,479 | A * | 8/1993 | Henderson | B01D 53/261 95/105 |
| 5,479,966 | A * | 1/1996 | Tison | F17C 5/06 141/12 |
| 8,757,223 | B2 * | 6/2014 | Uemura | F17C 5/06 141/95 |
| 9,261,295 | B1 * | 2/2016 | Schmidt | F25D 16/00 |
| 10,088,229 | B2 * | 10/2018 | Howard | F25J 1/0264 |
| 10,480,353 | B2 * | 11/2019 | Cook | F01D 15/10 |
| 2009/0151812 | A1 * | 6/2009 | Allidieres | F17C 5/007 141/11 |
| 2009/0229701 | A1 * | 9/2009 | Allidieres | F17C 5/06 141/2 |
| 2011/0108246 | A1 * | 5/2011 | Bahar | F25B 1/00 165/104.28 |
| 2012/0159970 | A1 | 6/2012 | Reese et al. | |
| 2013/0228151 | A1 * | 9/2013 | Dunn | F02B 17/005 123/294 |
| 2014/0102587 | A1 * | 4/2014 | Nagura | B60L 58/40 141/69 |
| 2015/0204485 | A1 * | 7/2015 | Varrassi | F17C 13/12 62/49.1 |
| 2015/0330571 | A1 * | 11/2015 | Beuneken | F17C 7/02 141/4 |
| 2015/0345703 | A1 * | 12/2015 | Allidieres | F17C 13/025 141/82 |
| 2016/0059690 | A1 * | 3/2016 | Wildgrube | F17C 5/06 180/69.5 |
| 2016/0146400 | A1 * | 5/2016 | Allidieres | F17C 5/06 141/4 |
| 2016/0153615 | A1 * | 6/2016 | Allidieres | F17C 5/007 141/4 |
| 2016/0208984 | A1 * | 7/2016 | Pages | F25J 1/0072 |
| 2016/0348840 | A1 * | 12/2016 | Nagura | F04B 41/02 |
| 2016/0370036 | A1 * | 12/2016 | Herzog | F17C 13/007 |
| 2017/0059089 | A1 * | 3/2017 | Uchida | F17C 13/026 |
| 2017/0241592 | A1 * | 8/2017 | Whiteman | F17C 5/06 |
| 2017/0291486 | A1 * | 10/2017 | Tanaka | F02M 25/10 |
| 2017/0328519 | A1 * | 11/2017 | Okuno | F17C 5/007 |
| 2018/0306381 | A1 * | 10/2018 | Fujisawa | F17C 5/06 |
| 2019/0003648 | A1 * | 1/2019 | Kunberger | F17C 13/028 |
| 2019/0041003 | A1 * | 2/2019 | Hashimoto | F04B 41/02 |
| 2021/0131611 | A1 | 5/2021 | Grandjean et al. | |

FOREIGN PATENT DOCUMENTS

| | | |
|---|---|---|
| EP | 3 631 280 | 4/2020 |
| JP | 2014-238159 | 12/2014 |
| WO | WO 2002/064395 | 8/2002 |

OTHER PUBLICATIONS

French Search Report and Written Opinion for FR 1 754 787, dated Feb. 8, 2018.

* cited by examiner

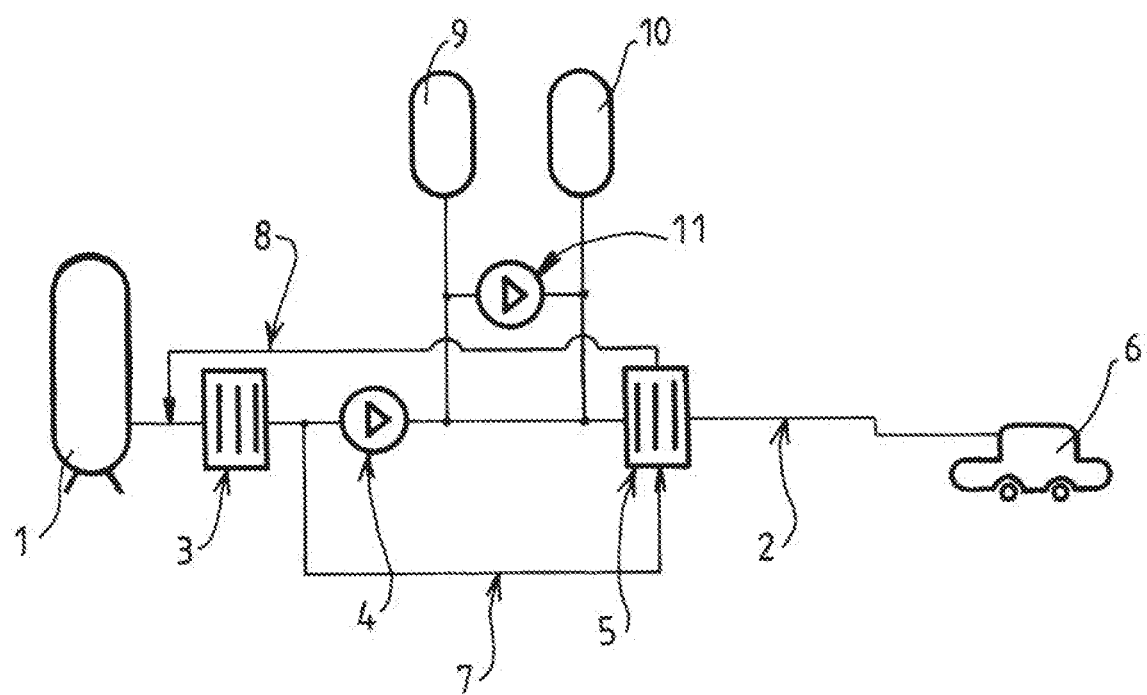

STATION AND METHOD FOR REFILLING PRESSURIZED GAS TANKS

CROSS-REFERENCE TO RELATED APPLICATIONS

This application is a § 371 of International PCT Application PCT/FR2018/050949, filed Apr. 16, 2018, which claims § 119(a) foreign priority to French patent application FR 1754787, filed May 31, 2017.

BACKGROUND

Field of the Invention

The invention relates to an installation and a method for filling a tank or tanks.

The invention relates more particularly to an installation for filling a tank or tanks with pressurized gas, in particular with hydrogen, comprising a liquefied fluid store, a filling line comprising an upstream end connected to the liquefied fluid store and a downstream end intended to be connected to a tank to be filled, the filling line comprising, arranged in series, a vaporizer, a main compressor and a heat exchanger for cooling the compressed fluid downstream of the main compressor before transferring it into a tank to be filled.

Related Art

The filling of tanks with gas at high pressure, in particular with hydrogen, can be carried out starting from liquefied gas which is vaporized. See for example WO 02/064395 A2.

The known solutions are, however, unsatisfactory because either they do not allow fast filling with gas with pre-cooling or they do not make it possible to optimize the efficiency of the installation (optimization of energy or gas).

SUMMARY OF THE INVENTION

It is an object of the present invention to alleviate all or some of the above-mentioned disadvantages of the prior art.

To this end, the installation according to the invention, furthermore in accordance with the generic definition given in the preamble above, is essentially characterized in that it comprises a cooling circuit comprising a transfer line having an upstream end connected to the outlet of the vaporizer and a downstream end connected to the heat exchanger, the transfer line being configured to transfer fluid leaving the vaporizer into the heat exchanger and to carry out an exchange of heat between this vaporized fluid and the compressed gas that is transferred into the tank to be filled.

Moreover, embodiments of the invention may comprise one or more of the following features:
- the cooling circuit comprises a recovery line comprising an upstream end connected to the heat exchanger and a downstream end connected to the filling line, for reinjecting into the filling line the fluid which has exchanged thermally with the compressed gas,
- the downstream end of the recovery line is connected to the filling line upstream of the vaporizer,
- the installation comprises at least one buffer storage connected to the filling line downstream of the main compressor and upstream of the heat exchanger,
- the installation comprises two buffer storages connected in parallel to the filling line downstream of the main compressor and upstream of the heat exchanger,
- the installation comprises an auxiliary compressor having a suction inlet connected to a first buffer storage and an outlet connected to the second buffer storage to allow transfer and compression of gas from the first to the second buffer storage.

The invention also relates to a method for filling a tank or tanks with pressurized gas, in particular with hydrogen, by means of an installation in accordance with any one of the above characteristics above or below wherein the liquefied fluid is heated in the vaporizer to a temperature of between −250° C. and 0° C. and preferably between −180° C. and −90° C. and in particular between −150° C. and −100° C.

According to other possible specific features:
- at the inlet of the main compressor, the fluid to be compressed has a temperature of between −250° C. and 0° C. and preferably of between −180° C. and −90° C. and a pressure of between 2 and 20 bar and preferably of between 8 and 12 bar,
- the method comprises a step of transferring fluid vaporized by the vaporizer into the heat exchanger for cooling the relatively hot compressed gas transferred to the tank to be filled by heat exchange with said relatively cooler vaporized fluid,
- the method comprises a step of reinjecting, into the filling line, the vaporized fluid exchanged thermally in the heat exchanger with the compressed gas,
- the vaporized fluid which has exchanged thermally in the heat exchanger with the compressed gas is reinjected upstream of the vaporizer,
- at the outlet of the main compressor, the gas has a pressure of between 200 and 700 and preferably between 400 and 600 bar,
- the method comprises a step of transferring the fluid compressed by the main compressor into a first buffer storage (9),
- the method comprises a step of heating gas taken from the gaseous headspace of the store in the vaporizer and a step of compressing this heated gas.

The invention may also relate to any alternative device or method comprising any combination of the features above or below.

BRIEF DESCRIPTION OF THE FIGURES

Other specific features and advantages will become apparent from reading the following description, given with reference to the single FIGURE which depicts a schematic and partial view of one example of the structure and operation of an installation according to the invention.

The FIG. is a schematic of the invention.

DETAILED DESCRIPTION OF THE INVENTION

The installation for filling a tank or tanks with a pressurized gas illustrated in the single FIGURE comprises a liquefied fluid store 1, for example a cryogenic tank of liquid hydrogen.

The installation comprises a filling line 2 comprising an upstream end connected to the liquefied fluid store 1 and at least one downstream end intended to be connected to a tank 6 to be filled (for example via at least one hose).

The filling line 2 comprises, arranged in series, a vaporizer 3, a main compressor 4 and a heat exchanger 5.

The installation also comprises a cooling circuit 7, 8 comprising a transfer line 7 having an upstream end connected to the outlet of the vaporizer 3 and a downstream end connected to the heat exchanger 5. This transfer line 7 is configured to transfer fluid leaving the vaporizer 3 into the heat exchanger 5 and to achieve heat exchange (preferably indirect heat exchange) between this relatively cold vaporized fluid and the relatively hot compressed gas which is transferred into the tank 6 to be filled.

For example, the installation comprises a system of valve(s), that are preferably controlled, for controlling the flow rate of cold cooling fluid in the cooling line 7. For example, the transfer line 7 is connected as a bypass to the filling line 2. One or more valves (two-way or three-way valves) may be provided for distributing the flow of fluid between the transfer line 7 and the inlet of the compressor 4. For example, these valves can be controlled by an electronic control member comprising a microprocessor. This control can be slaved for example to a temperature setpoint of the gas transferred into the tank 6.

The cooling circuit 7, 8 preferably also comprises a recovery line 8 having an upstream end connected to the heat exchanger 5 and a downstream end connected to the filling line 2. This makes it possible to reinject into the filling line 2 the relatively cold fluid that has exchanged thermally with the compressed gas.

As shown, the downstream end of the recovery line 8 can be connected to the filling line 2 upstream of the vaporizer 3.

As also illustrated, the installation may comprise at least one buffer storage 9, 10 connected to the filling line 2 downstream of the main compressor 4 and upstream of the heat exchanger 5. For example, two (or more) buffer storages 9, 10 are connected in parallel to the filling line 2 downstream of the main compressor 4 and upstream of the heat exchanger 5.

These buffer storages 9, 10 can store gas compressed by the main compressor 4.

The installation may comprise an additional auxiliary compressor 11 having a suction inlet connected to a first buffer storage 9 and an outlet connected to the second buffer storage 10, to permit transfer and compression of gas from the first to the second buffer storage 10.

The auxiliary compressor 11 may be a high-pressure compressor, i.e. a compressor configured to compress gas at a higher pressure than the main compressor 4.

The buffer storages 9, 10 can be used to transfer gas into the tank 6 to be filled by pressure equalizing (in particular cascade). In addition at least one of these buffer tanks 9, 10 may where appropriate be used to serve as a source of gas for the compressor 11 for the purpose of filling the tank 6.

Thus, liquid hydrogen can be vaporized through the vaporizer 3 (such as an atmospheric heater for example) to reach a temperature below −100° C., for example of the order of −150° C.

This relatively cold hydrogen, at a pressure for example of the order of 10 bar, can be compressed at medium pressure (between 100 and 600 bar for example) in the main compressor 4.

At the inlet of the main compressor 4, the fluid to be compressed has for example a temperature of between −250° C. and 0° C. and preferably of between −180° C. and −90° C., in particular between −150° C. and −100° C. This fluid has for example a pressure of between 2 and 20 bar and preferably of between 8 and 12 bar.

This medium-pressure hydrogen can be transferred into a buffer storage 9 at medium pressure and/or compressed via the auxiliary compressor 11 at high pressure. This high-pressure gas (for example 700 to 1100 bar) can be stored in a high-pressure buffer storage 10.

In order to cool the relatively hot compressed gas (for example at ambient temperature from the buffer storages 9, 10), before filling the tank 6, a portion of the cold hydrogen at the outlet of the vaporizer/heater 3 can thus be brought into the cooling exchanger 5.

This cold hydrogen which has yielded frigories and has been heated in the exchanger 5 can be reinjected via the recovery line 8 upstream of the vaporizer 3 in order to be mixed with the cold hydrogen coming from the liquid store 1.

This contributes to the heating of the liquid before it passes into the vaporizer/atmospheric heater 3.

It should be noted that the hydrogen in the gas headspace of the liquid store 1 can be used while being heated in the vaporizer/atmospheric heater 3 before being compressed in the cold compressor 3 (for example via the filling line 2 or another dedicated line not shown).

Thus, while being simple in structure and inexpensive, the installation allows efficient recovery of all or part of the losses of the liquid hydrogen tank. In addition, the frigories of the liquid hydrogen are advantageously used to cool the gas, just before filling the tank 6.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited,

What is claimed is:

1. An installation for filling a tank or tanks with pressurized hydrogen, comprising: a liquefied fluid store containing liquefied fluid, a filling line comprising an upstream end connected to the liquefied fluid store and a downstream end intended to be connected to a tank to be filled, and a cooling circuit, wherein:

the filling line comprises, arranged in series, a vaporizer, a main compressor and a heat exchanger for cooling the compressed fluid downstream of the main compressor before it is transferred into the tank to be filled;

the cooling circuit comprises a transfer line and a recovery line;

the transfer line has an upstream end connected to the outlet of the vaporizer and a downstream end connected to the heat exchanger;

the transfer line is configured to transfer, into the heat exchanger, vaporized fluid leaving the vaporizer such that heat is exchanged between the vaporized fluid and a compressed gas which is transferred into the tank to be filled;

the recovery line comprises an upstream end connected to the heat exchanger and a downstream end connected to the filling line for reinjecting, into the filling line, the fluid that has exchanged thermally with the compressed gas.

2. The installation of claim 1, wherein the downstream end of the recovery line is connected to the filling line upstream of the vaporizer.

3. The installation of claim 1, further comprising at least one buffer storage connected to the filling line downstream of the main compressor and upstream of the heat exchanger.

4. The installation of claim 3, further comprising two buffer storages connected in parallel to the filling line downstream of the main compressor and upstream of the heat exchanger.

5. The installation of claim 4, further comprising an auxiliary compressor having a suction inlet connected to a first buffer storage and an outlet connected to the second buffer storage, to allow transfer and compression of gas from the first to the second buffer storage.

6. A method for filling a tank or tanks with pressurized gas with the installation of claim 1, comprising the steps of:

heating the liquefied fluid in the vaporizer to a temperature of between $-250°$ C. and $0°$ C.;

compressing a first portion of the fluid vaporized by the vaporizer to produce a compressed gas;

transferring the compressed fluid into the heat exchanger;

transferring a second portion of the fluid vaporized by the vaporizer into the heat exchanger, wherein the portion of the fluid vaporized by the vaporizer that is transferred into the heat exchanger is cooler than the compressed gas;

exchanging heat, at the heat exchanger, between the compressed gas and the second portion of the fluid that was vaporized by the vaporizer to produce a cooled compressed fluid and a warmed vaporized fluid; and reinjecting, into the filling line, the warmed vaporized fluid.

7. The method of claim 6, wherein, at an inlet of the compressor, the fluid to be compressed has a temperature of between $-250°$ C. and $0°$ C. and a pressure of between 2 and 20 bar.

8. The method of claim 6, wherein, at an inlet of the compressor, the fluid to be compressed has a temperature of between $-180°$ C. and $-90°$ C. and a pressure of between 2 and 20 bar.

9. The method of claim 6, wherein, at an inlet of the compressor, the fluid to be compressed has a temperature of between $-250°$ C. and $0°$ C. and a pressure of between 8 and 12 bar.

10. The method of claim 6, wherein, at an inlet of the compressor, the fluid to be compressed has a temperature of between $-180°$ C. and $-90°$ C. and a pressure of between 2 and 20 bar.

11. The method of claim 6, wherein the vaporized fluid which has thermally exchanged in the heat exchanger with the compressed gas is reinjected upstream of the vaporizer.

12. The method of claim 6, wherein, at the outlet of the main compressor, the gas has a pressure of between 200 and 700.

13. The method of claim 12, wherein, at the outlet of the main compressor, the gas has a pressure of between 400 and 600 bar.

14. The method of claim 6, further comprising a step of transferring the compressed gas into a first buffer storage.

15. The method of claim 6, further comprising heating, in the vaporizer, and compressing gas taken from a headspace of the liquefied gas store.

16. The method of claim 6, wherein the pressurized gas is hydrogen.

17. The method of claim 6, wherein the liquefied fluid is heated in the vaporizer to a temperature of between $-180°$ C. and $-90°$ C.

18. The method of claim 6, wherein the liquefied fluid is heated in the vaporizer to a temperature of between $-150°$ C. and $-100°$ C.

* * * * *